United States Patent [19]

Schwarz

[11] 4,030,179

[45] June 21, 1977

[54] METHOD OF MANUFACTURING LOW COST NON-POROUS METAL CONNECTING RODS

[75] Inventor: Leonard H. Schwarz, West Hartford, Conn.

[73] Assignee: Dunham-Bush, Inc., West Hartford, Conn.

[22] Filed: Jan. 19, 1976

[21] Appl. No.: 650,401

[52] U.S. Cl. .......................... 29/156.5 A; 29/411; 29/417; 29/463; 74/579 E

[51] Int. Cl.² ........................................ B23P 15/00

[58] Field of Search ............ 29/156.5 A, 411, 412, 29/417, 416, 463, 445, DIG. 47; 74/579 E, 579 R

[56] References Cited

UNITED STATES PATENTS

| 1,368,045 | 2/1921 | Murray, Jr. et al. | 29/411 |
| 1,400,829 | 12/1921 | Oakley | 29/156.5 A |
| 1,948,176 | 2/1934 | Hopkins et al. | 29/156.5 A |
| 2,239,203 | 4/1941 | Rendleman | 29/417 |
| 2,703,263 | 3/1955 | Zernov | 29/156.5 A |
| 3,441,995 | 5/1969 | Revell et al. | 29/416 |
| 3,807,009 | 4/1974 | Östbo | 29/411 |
| 3,947,947 | 4/1976 | Hess et al. | 29/411 |

FOREIGN PATENTS OR APPLICATIONS

| 27,158 | 5/1970 | Japan | 29/417 |

Primary Examiner—Milton S. Mehr
Assistant Examiner—Daniel C. Crane
Attorney, Agent, or Firm—Sughrue, Rothwell, Mion, Zinn & Macpeak

[57] ABSTRACT

Complementary semi-tubular metal bars of non-porous metal are extruded to form bar stocks of given length, complementary edges of the semi-tubular metal bars are clamped in edge abutment, a series of longitudinally spaced holes are drilled along respective edges through one of said bars and partially through the other, the holes partially drilled through the edges of the second bar are tapped and the bars are screwed together prior to severing individual connecting rods from the joined bars at points intermediate of the screws.

3 Claims, 3 Drawing Figures

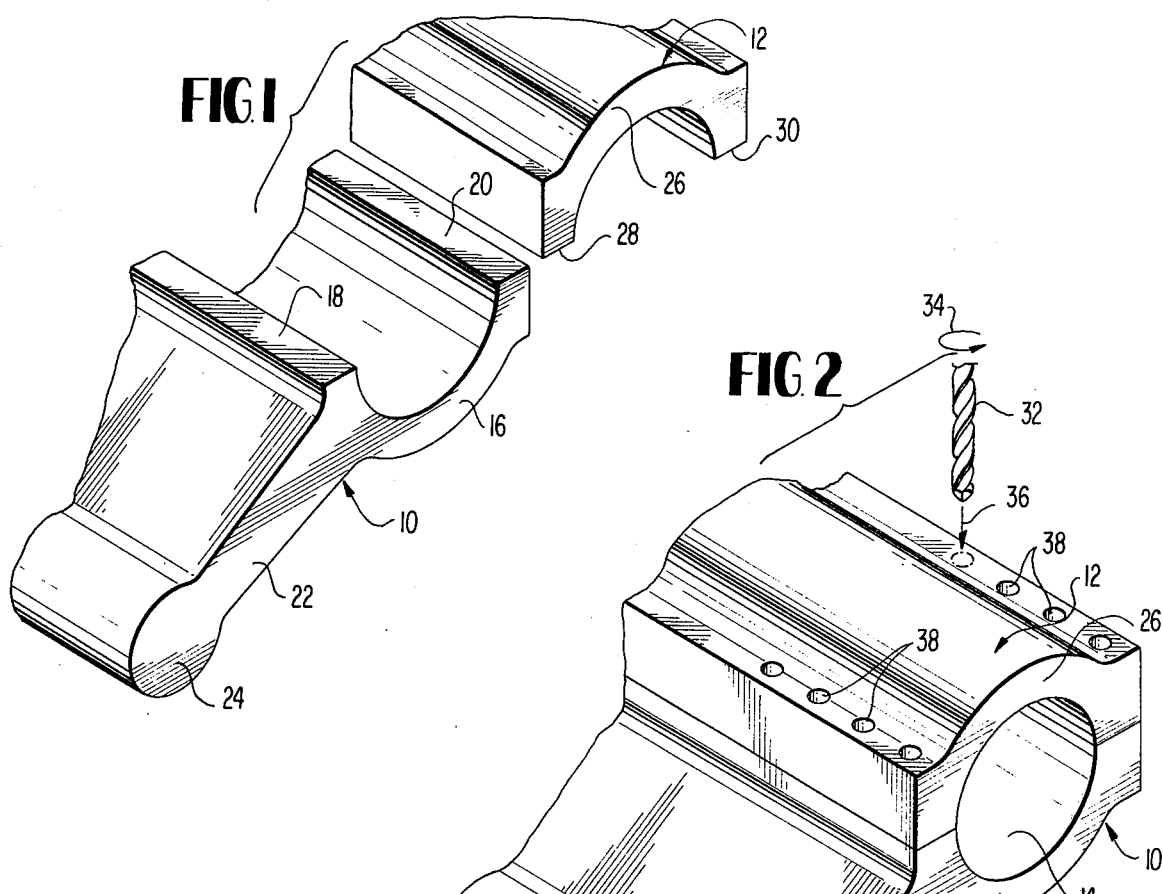
FIG. 1
FIG. 2
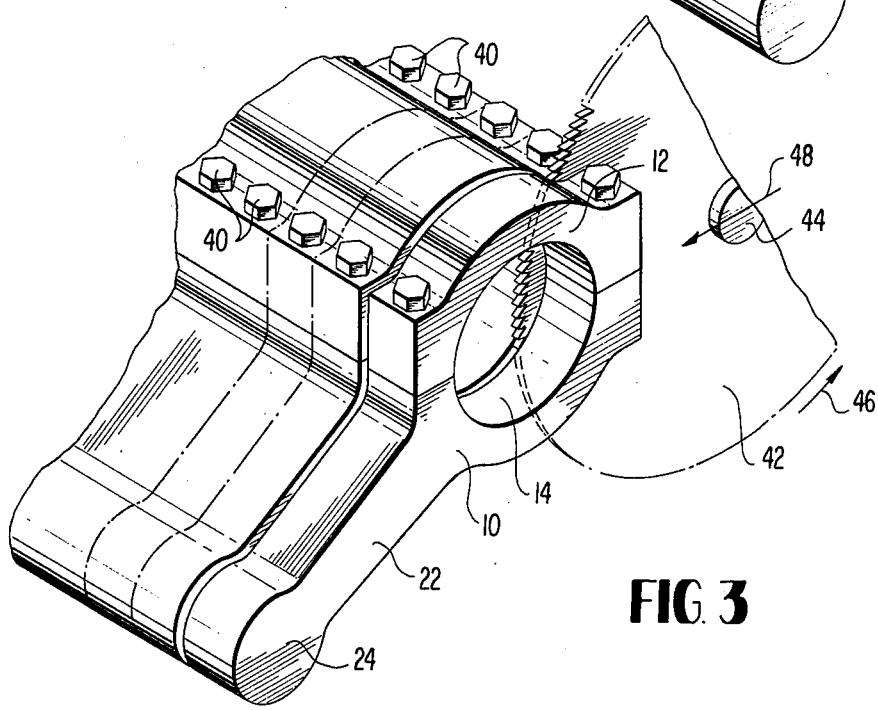
FIG. 3

METHOD OF MANUFACTURING LOW COST NON-POROUS METAL CONNECTING RODS

BACKGROUND OF THE INVENTION

Field of the Invention

This invention relates to a method of manufacturing metal connecting rods for reciprocating gas compressors and the like, and more particularly, to a low cost method of manufacturing such connecting rods of non-porous metal.

Description of the Prior Art

Commonly, connecting rods for reciprocating gas compressors have been manufactured by stamping unitary connecting rods from metal bar stock or by casting the connecting rods in semi-finished state, and machining the cast or stamped rods to the close dimensional requirements required for use, particularly with respect to the bores within the rods for receiving the shafts for mounting the same. While the stamped metal connecting rods operate satisfactorily in practice, the metal stamping processes are complicated and quite costly.

To the contrary, the metal casting of the connecting rods in semi-finished state is relatively inexpensive and can be accomplished in a single step process. However, the rods are unsatisfactory because of the voids inherent to the casting process, that is, the cast metal rods have a porosity which far exceeds the stringent requirements of such metal parts for the stresses involved in actual use within air compressors and the like.

SUMMARY OF THE INVENTION

The present invention, therefore, has as its primary object the purpose of producing metal connecting rods for gas compressors and the like which are characterized by low cost of manufacture and minimum porosity. The metal connecting rods are manufactured in a sequence of steps comprising the extrusion of semi-tubular metal bars having complementary edges, clamping the bars in edge abutting position, commonly drilling a series of longitudinally spaced holes through abutting edges on both sides of one bar and partially through the corresponding edges of the second bar at the interface therebetween, tapping at least the partially drilled holes within the second bar and screwing the tubular metal bars together and subsequently severing individual rods from the joined bars at points intermediate of the screws.

BRIEF DESCRIPTION OF THE DRAWINGS

FIG. 1 is an exploded, perspective view of a portion of a pair of metal semi-tubular metal bars during extrusion which form the bar stock for the connecting rods of the present invention.

FIG. 2 is a perspective view of a portion of the bars of FIG. 1 clamped together for drilling of screw holes within complementary edges of respective metal bars.

FIG. 3 is a perspective view of the assembled tubular metal bars during severance of the same to form individual connecting rods.

DESCRIPTION OF THE PREFERRED EMBODIMENT

Reference to FIG. 1 illustrates a preferred form of the present invention as applied to the manufacture of metal connecting rods of the type employed in reciprocating air compressors and the like. Mating semi-tubular metal bars are extruded of high density metal such as aluminum to form an assembly. Lower semi-tubular bar indicated generally at 10 underlies a second, upper semi-metal bar indicated generally at 12 extruded of the same metal, such as aluminum. The semi-tubular metal bars 10 and 12 have complementary portions which define as seen in FIG. 2 a cylindrical hole 14, ultimately acting as the journal bearing for the shaft (not shown) upon which the connecting rods are mounted. In this respect, the semi-tubular metal bar 10 is provided with a circular portion 16 terminating in flat laterally spaced edges 18 and 20, the bar 10 being further provided with an integral radial portion or arm 22 terminating in an enlarged end portion 24. The semi-tubular metal bar 12 is of complementary configuration, that is, it is provided with a circular portion 26 terminating at each side in flat edges 28 and 30 which are complementary to and abut edges 18 and 20 respectively of bar 10 when the semi-tubular metal bar 12 overlies bar 10 with those edges in confronting contact. The assembly of the bars subsequent to the extrusion step of FIG. 1 is shown in FIG. 2. By reference to FIG. 2, clamping means (not shown) maintain the semi-tubular metal bar 12 mounted to the underlying semi-tubular metal bar 10 such that the circular section or portions 16 and 26 form the cylindrical opening 14. With the edges 18 and 28 in abutment and 20 and 30 in abutment, respectively, a drill 32 or other boring tool is rotated about its axis as shown by arrow 34 and moved downwardly as shown by arrow 36 to effect drilling of a hole 38 completely through respective sides of the upper semi-tubular metal bar 12 and partially through the sides of the lower tubular metal bar 10. Subsequent to drilling of the holes 38 at longitudinally spaced locations along both sides of both bars, at least those portions of the holes 38 extending within the lower semi-tubular metal bars 10 are tapped, and seen further in FIG. 3, threaded screws 40 are inserted within holes 38 to threadably connect the upper semi-tubular metal bar 12 to the lower semi-tubular metal bar 10 with the edges 18–28 and 20–30 in confronting position.

With the bars tightly connected together, the next step in the manufacturing process as seen in FIG. 3, involves the utilization of a rotary saw such as saw blade 42 which is shown mounted for rotation about its axis by way of shaft 44 as seen by arrow 46 and for movement transversely as seen by arrow 48 relative to the assembly of the two bars 10 and 12 to effect severance of the clamped bars into individual semi-finished connecting rods, awaiting only the drilling of suitable holes within the enlarged ends 24 of the radially projecting arms 22 of the assembly. This may be accomplished prior to the assembly and drilling step of FIG. 2 or before or subsequent to the sawing step of FIG. 3. It may be desirable to bore hole 14 of the total assembly of FIG. 2 prior to the sawing step of FIG. 3 as well as to drill commonly through the enlarged end 24 of the connecting rod arm 22. The screws 40 particularly facilitate the maintaining of the coupled semi-tubular metal bars 10 and 12 as a rigid assembly during the severance of the individual connecting rods by the rotating saw blade 42 as well as finishing the shaft receiving hole 14.

While the invention has been particularly shown and described with reference to a preferred embodiment thereof, it will be understood by those skilled in the art that various changes in form and details may be made therein without departing from the spirit and scope of the invention.

I claim:

1. A method of manufacturing a series of dense, non-porous metal connecting rods comprising, in sequence, the steps of:
   extruding semi-tubular metal bars having complementary edges and semi-circular recesses of equal diameter within the faces of said bars,
   detachably joining said bars together at said complementary edges to form a rigid assembly defining a true circular opening therein running the complete length of said assembly, and
   severing individual connecting rods from said assembly by sawing through said assembly at right angles to the axis of said joined semi-tubular metal bars such that each rod upon severance has a true circular opening formed by said joined portions of said bars.

2. A method of manufacturing a series of dense, non-porous metal connecting rods comprising, in sequence, the steps of:
   extruding semi-tubular metal bars having complementary edges and semi-circular recesses of equal diameter within respective bars,
   detachably bolting said semi-tubular metal bars together about both edges at longitudinally spaced positions to form a rigid assembly defining a true circular opening therein running the complete length of said assembly, and
   severing individual connecting rods from said assembly by sawing through said assembly at right angles to the axis of the joined semi-tubular metal bars at points intermediate of said bolts such that each rod upon severance is joined by said bolts and has a true circular opening formed by said joined portions of said bars.

3. A method of manufacturing a plurality of metal connecting rods comprising, in sequence, the steps of:
   extruding semi-tubular metal stock bars having complementary edges,
   clamping said bars together in edge abutting position to form a closed tube assembly,
   commonly drilling a series of longitudinally spaced holes along both sides of one of said bars and partially through respective sides of said other bar at said abutting edges,
   tapping said holes in, in at least said other bar,
   inserting screws within said holes of said one bar and said tapped holes of said other bar,
   tightening said screws to lock said bars together at said complementary edges, and
   severing individual connecting rods from the remainder of said coupled tubular metal bar assembly.

* * * * *